United States Patent [19]
Mitchell

[11] Patent Number: 6,163,919
[45] Date of Patent: Dec. 26, 2000

[54] SCRAPER

[76] Inventor: David Mitchell, 6779 Waverly St., Montréal, Quebec, Canada

[21] Appl. No.: 09/161,620

[22] Filed: Sep. 28, 1998

[51] Int. Cl.⁷ .................................................. A47L 13/022
[52] U.S. Cl. .................. 15/236.02; 15/143.1; 15/236.01; 30/169
[58] Field of Search .............................. 15/143.1, 236.01, 15/236.02; 30/169

[56] References Cited

U.S. PATENT DOCUMENTS

| | | | |
|---|---|---|---|
| 701,503 | 6/1902 | Plummer | 30/169 |
| 2,178,019 | 10/1939 | Knuteson . | |
| 4,813,458 | 3/1989 | Jacobucci . | |
| 4,888,846 | 12/1989 | Natale | 15/143.1 |
| 4,962,561 | 10/1990 | Hamilton . | |
| 5,379,758 | 1/1995 | Snyder | 15/143.1 |
| 5,455,981 | 10/1995 | Wiese . | |
| 5,471,698 | 12/1995 | Francis et al. . | |
| 5,471,700 | 12/1995 | Pereira . | |

FOREIGN PATENT DOCUMENTS 0331025 12/1920 Germany ............................ 15/236.01

*Primary Examiner*—Randall E. Chin
*Attorney, Agent, or Firm*—Darby & Darby

[57] ABSTRACT

A hand-held scraper having a handle section and a relatively short scraping section carried by the handle section. The scraping section has a forwardly directed scraping edge. A hand grip is carried by the handle section and extends upwardly from the top surface of the handle section. The scraper has a forearm support section which extends rearwardly from the base section in a position to rest solely against the bottom of a person's forearm when the person grips the hand grip of the scraper to operate the scraper.

17 Claims, 4 Drawing Sheets

SCRAPER

BACKGROUND OF THE INVENTION

1. Field of the Invention

This invention is directed toward an improved scraper. The invention is more particularly directed toward an improved ice scraper for scraping vehicle windshields.

2. Description of the Related Art Including Information Disclosed Under CFR §§ 1.97–1.99

Ice scrapers for scraping ice off windshields are well known. Most comprise a straight handle with a scraping blade mounted at one end. The scraping edge on the front of the scraping blade is generally aligned with the handle. These known scrapers are however somewhat inefficient since their construction makes it difficult to apply a large amount of force, directly against the ice, via the scraper blade to remove the ice. The user's wrist is not in the best position to apply a lot of force to the blade. Further, the wrist, in the position of use, is quite stressed during scraping and tires.

In an attempt to provide more effective removal of the ice by scraping it is known to provide a scraper with a scraper blade at one end, a relatively straight handle section leading rearwardly from the scraper blade, and an end section leading rearwardly from the handle section that is adapted to rest on the top of the forearm of the user during use of the scraper. Moving the forearm up while the end section of the scraper rests on the top of the forearm during scraping pivots the scraper about the handle section to have a reactive downward force applied to the scraper blade that is thought to help scraping. Examples of such scrapers are shown in U.S. Pat. Nos. 4,962,561 and 5,455,981.

To provide even better scraping action, scrapers of the type shown in the above U.S. Pat. Nos. 4,962,561 and 5,455,981 are provided with a frame extending between the scraper blade and the end section, the frame having an intermediate, transverse extending handle. Gripping the transverse handle provides better control of the scraper and allows more force to be applied to the scraper without tiring the wrist as much as when using a straight handle. Examples of such scrapers, with transverse handles and an end section that rests on the top of the forearm, are shown in U.S. Pat. Nos. 4,813,458 and 5,471,698.

It is also known to provide a scraper with a front scraper blade, an intermediate handle section, and an end section that rests on the top of the forearm, with a handgrip extending upwardly from the handle section. The handgrip is used to apply more force on the scraper blade than available with a straight handled tool and also to protect the hand when scraping a grill. An example of such a scraper is shown in U.S. Pat. No. 5,471,700.

All the above scrapers, that require the top of the forearm of the user to bear against the end section of the scraper to increase pressure applied by the scraper blade, have disadvantages. A conscious effort must be made to have the forearm bear against the end section. This causes stress in the user's wrist and arm and takes away from the scraping effort. Also, the end portion bears locally on the forearm causing discomfort at that location of the forearm.

SUMMARY OF THE INVENTION

It has been discovered that a more effective and efficient scraper can be made by providing the scraper with a rear support section, extending rearwardly from the handle section, that rests against, and supports, the under side of the person's forearm when using the scraper rather than resting against the top of the forearm. The scraper, with the rear forearm support section, is particularly enhanced when the handle of the scraper is in the form of a hand grip, the hand grip extending upright from the handle section of the scraper and generally transverse to the long axis of the scraper. The scraper, with the forearm support portion and the handgrip, is particularly constructed to have the scraping edge of the scraper located below an imaginary longitudinal center line in the upper surface of the forearm support portion while the hand grip is above the line.

The new scraper allows scraping at a steeper angle which ensures that the scraping edge of the scraper remains against the surface being cleaned, while still directing a large force against the edge of the material being removed. More importantly, pushing forwardly on the upright hand grip causes the rear forearm support section to bear upwardly against the bottom of the forearm and this creates a reactive downward and forward pressure that increases the scraping force applied against the ice by the scraper edge. Having the scraper edge located below the support surface while the hand grip is above the surface, creates a torque effect about the scraper edge while it abuts the edge of the material being scraped. This torque effect is resisted by the forearm support and translate a portion of the torque effect into increased pressure against the material being scraped. The forearm support section is shaped to cover a relatively large portion of the forearm minimizing local stress areas on the forearm. The structure of the scraper also does not require movement of the forearm to have the forearm actively contact the scraper. Thus the scraping action is more efficient.

Preferably, the angle between the longitudinal axis of the hand grip and the imaginary center line in the top surface of the forearm support is about a right angle. If the angle were less than about 85° the wrist would be bent back into an awkward position when holding the scraper and would quickly tire during use. If the angle were greater than about 110° the forearm would move away from the forearm support reducing the reactive force applied to the scraper. When the angle is about 90°, there is good contact of the under forearm by the rear section of the scraper.

Preferably, the vertical distance between the center of gravity of the hand grip and the scraper edge, is greater than the horizontal distance between the scraper edge and the longitudinal axis of the hand grip. This insures that the scraper can work at a relatively steep angle while still applying a great deal of force to the ice to make it easier to remove the ice. The forearm support section prevents the scraper from rotating over, counter clockwise during use while providing a reactive downward-forward force to help breakup and remove the ice along with the downward-forward force provided by the hand grip.

The invention is particularly directed toward a hand held scraper having a handle section and a relatively short scraping section carried by the handle section. The scraping section has a forwardly directed scraping edge. A hand grip is carried by the handle section, the hand grip extending upwardly from the top surface of the handle section. The scraper also has a forearm support section, the support section extending rearwardly from the base section in a position to rest solely against the bottom of a person's forearm when the person grips the hand grip of the scraper to operate the scraper.

DESCRIPTION OF THE PREFERRED EMBODIMENTS

Figure 1:
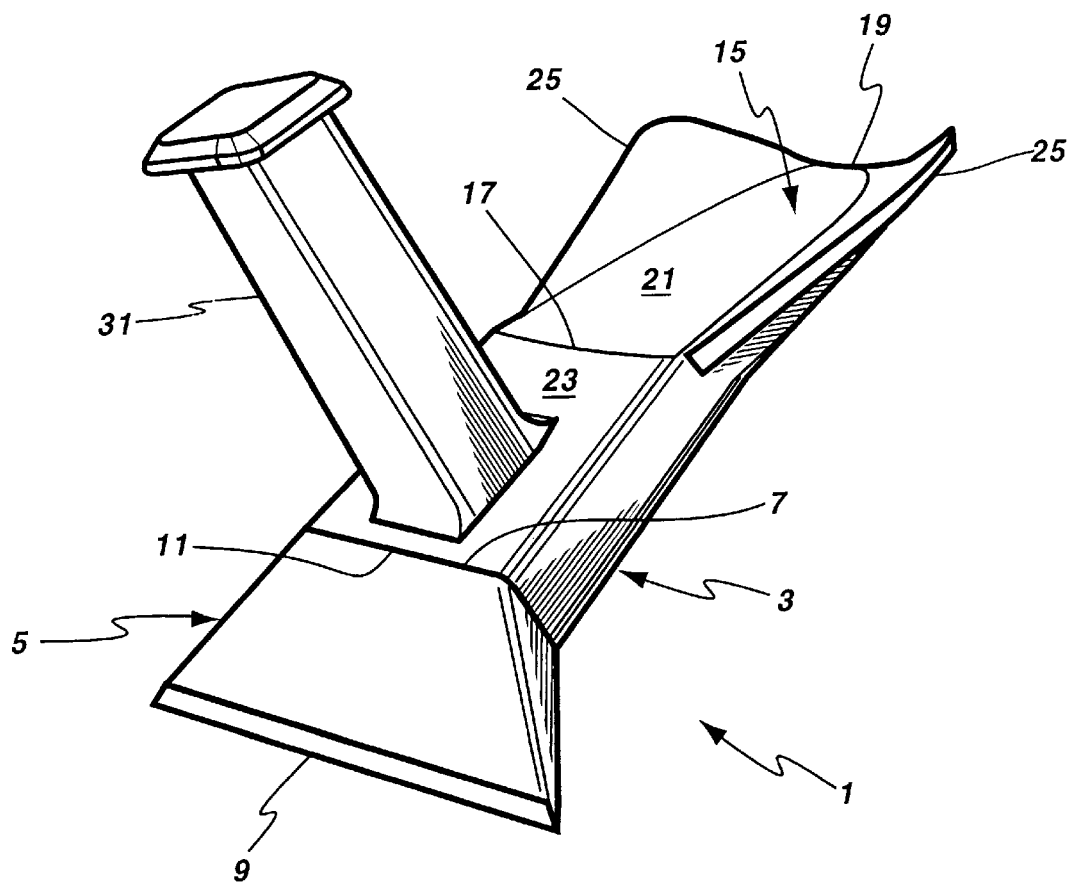
FIG. 1 is a perspective view of the scraper.
Figure 2:
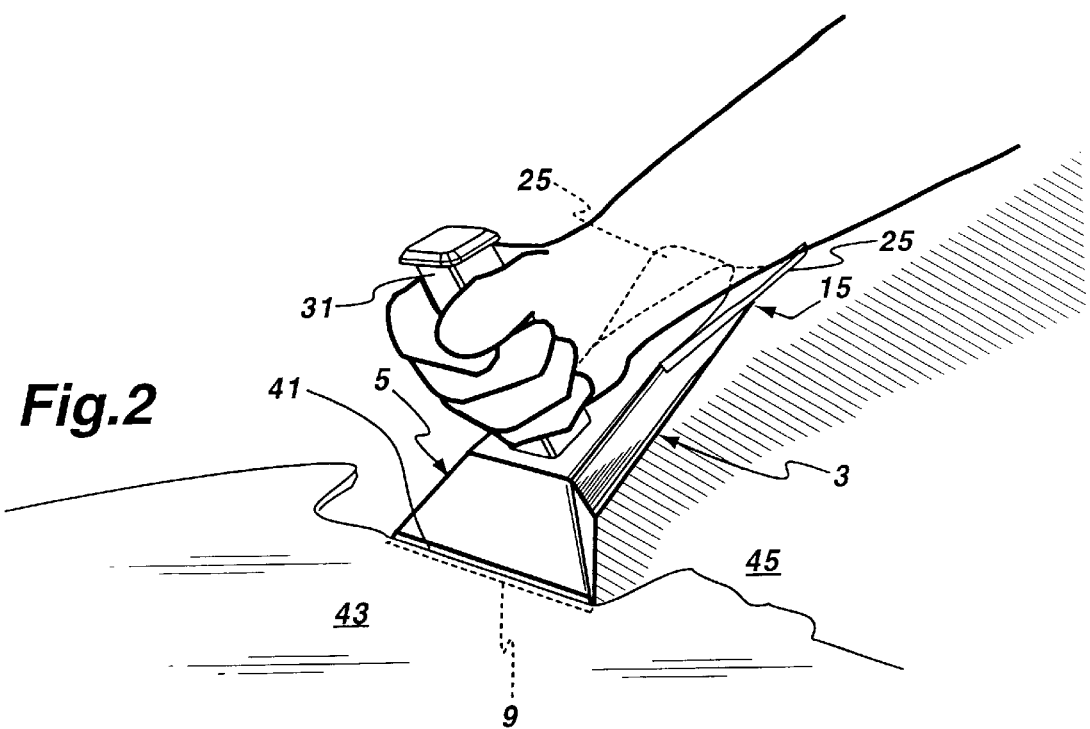
FIG. 2 is a perspective view of the scraper in use.
Figure 3:
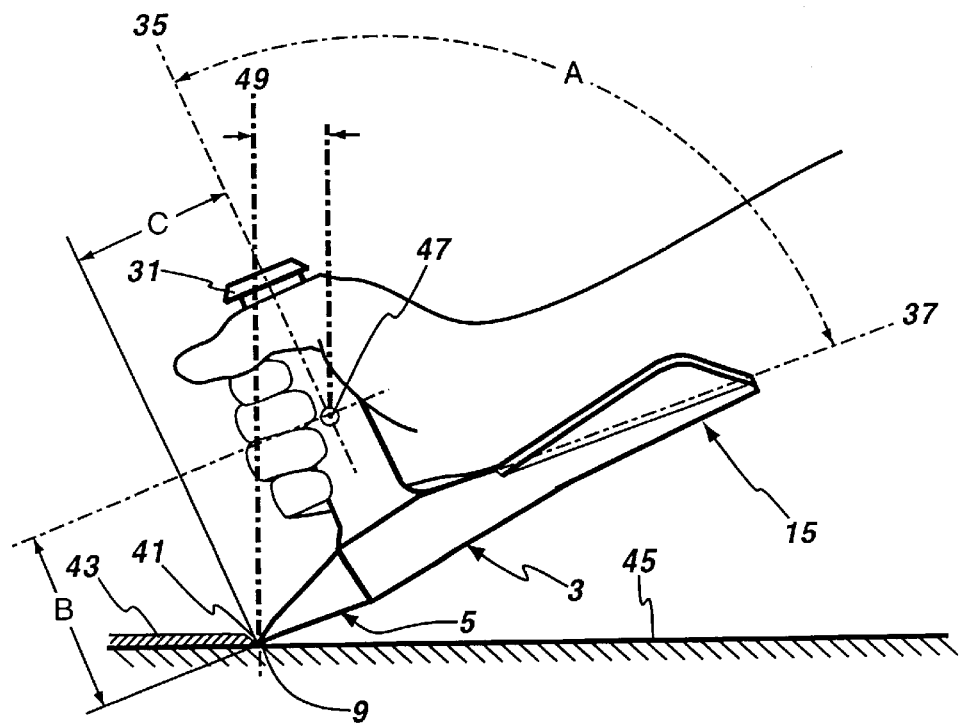
FIG. 3 is a side view of the scraper in use.

The scraper 1 of the present invention, as shown in FIGS. 1 to 3, has an intermediate, handle section 3. This handle section 3 has the very general shape of a relatively thin, rectangular block with the long axis of the block running in the front-back direction and the short axis running in the top-bottom direction. A relatively short front scraping section 5 extends forwardly from the front 7 of the intermediate handle section 3. The front scraping section 5 can taper in width from its leading edge 9 to its rear end 11 where it connects to the intermediate handle section 3. The scraping section 5 can also taper in thickness from its rear end 11 to its leading edge 9, the leading edge 9 being sharp and forming the scraping edge of the tool.

The scraper 1 has a rear forearm support section 15 that extends rearwardly from the back 17 of the handle section 3. The support section 15 can taper slightly in thickness toward its rear end 19 with its upper support surface 21 angled slightly downwardly from the top surface 23 of the handle section 3. The upper support surface 21 can be made slightly concave to more comfortably receive the forearm of the user. Side support wings 25 can be provided on the sides 27 of the support section 15 near its rear end 19. The support wings 25 extend laterally and are curved upwardly toward their outer ends to help support the forearm.

A hand grip 31 extends upwardly from the top surface 23 of the handle section 3. The hand grip 31 is located closer to the front end 7 of the handle section than to its rear end 17.

Preferably, the angle "A", formed between the longitudinal axis 35 of the hand grip 31 and an imaginary longitudinal line 37 extending along the center of the upper support surface 21 of the support section 15, is a right angle. However, the angle "A" can range between eighty five degrees and one hundred and ten degrees. The angle "A" ensures that the wrist is in a comfortable, natural position when gripping the hand grip 31 and operating the scraper 1. It is also noted that the scraping edge 9 lies below the imaginary longitudinal line 37.

In use, the hand grip 31 of the scraper 1 is gripped by one hand and the scraper is tilted forwardly with the scraping edge 9 abutting the edge 41 of the ice 43 to be removed from a windshield 45 as shown in FIG. 3. The scraper 1 is usually tilted to have the center of gravity 47 of the hand grip 31 located just behind a line 49 extending transversely upwardly from the windshield 45 at the point of contact 41 of the scraping edge 9 with the ice 43. It will be seen that the scraping edge 9 is located below the imaginary line 37 while the hand grip 31 is substantially above it. Pushing forward with the hand grip 31 causes a torque about the edge 41 of the ice 43 and causes the forearm support section 15 to bear upwardly against the underside of the user's forearm. This causes a reactive force downwardly and forwardly that helps to remove the ice more easily. The horizontal distance "C" between the scraping edge 9 and the longitudinal axis 35 of the hand grip 31 is always less than the vertical distance "B" between the center of gravity 47 of the hand grip 31 and the scraping edge 9 to promote the torque action which is resisted by the support section 15. Having the angle "A" at or close to a right angle positions the wrist and fingers comfortably while gripping the hand grip 31 so that the user can exert force efficiently without getting sore and tired.

If required, extra pressure can easily be exerted onto the scraper 1 by having the user place his other hand over the top of the hand grip 31 and pressing down.

Figure 4:
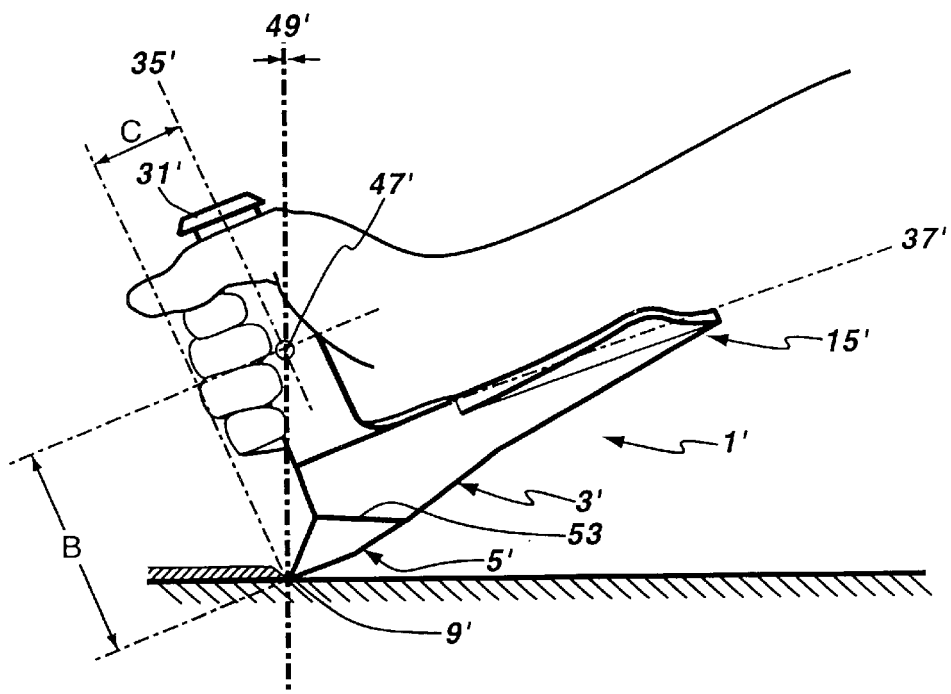
FIG. 4 is a side view of another embodiment of the scraper in use.

In a modified scraper 1', as shown in FIG. 4, the scraping section 5' is located on the front, lower portion 53 of the handle section 3'. This locates the scraping edge 9' further away from the imaginary line 37' along the surface of the support section 15' and closer to, but still in front of, the center line 35' of the hand grip 31', the distance "C" being reduced. This arrangement creates an even greater torque about the scraping edge 9' when the scraper is used and an even greater reactive force is generated through the support section 15'.

Figure 5:
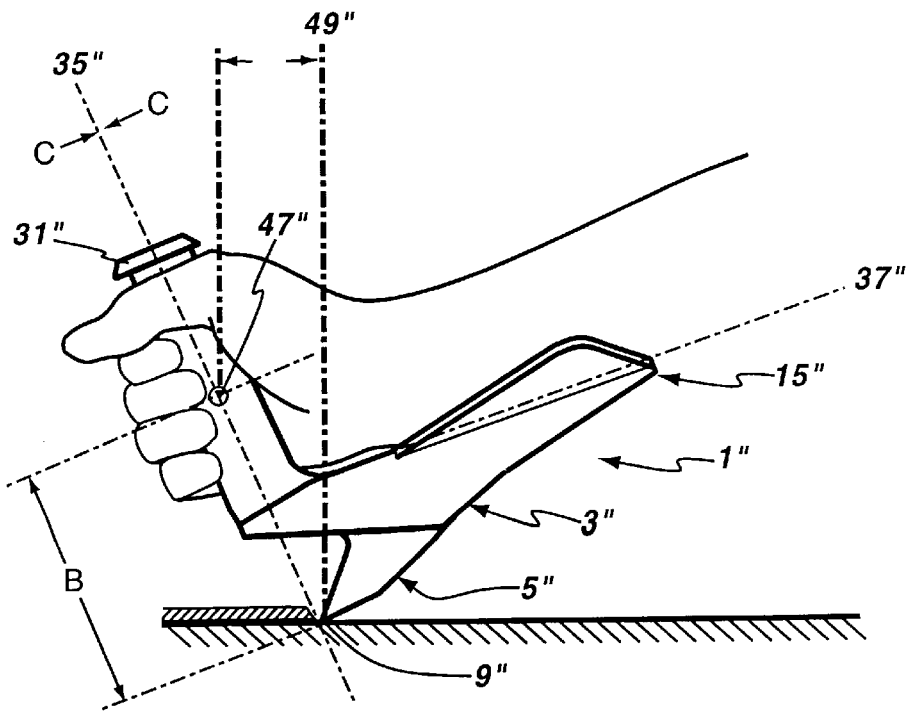
FIG. 5 is a further embodiment of the scraper in use.

In a further modification, shown in FIG. 5, the scraping section 5" can be located toward the bottom, rear of the handle section 3". In this embodiment, the handgrip 31" is supported in cantilever fashion by the handle section 3" over the scraping section 5". The scraping edge 9" is still further from the imaginary line 37" and is aligned with the center line 35" of the hand grip 31". This arrangement creates even greater torque during use of the scraper.

Figure 6:
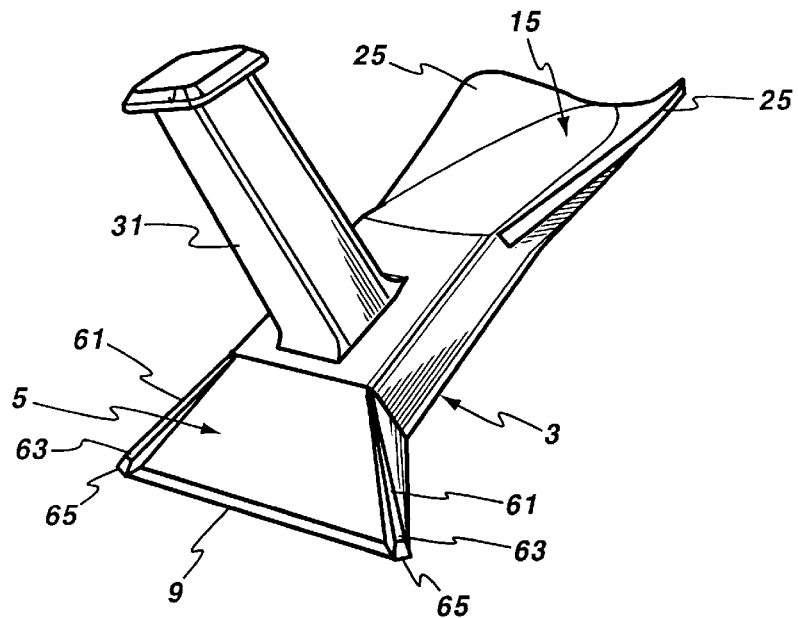
FIG. 6 is a perspective view of a modified scraper.
Figure 7:
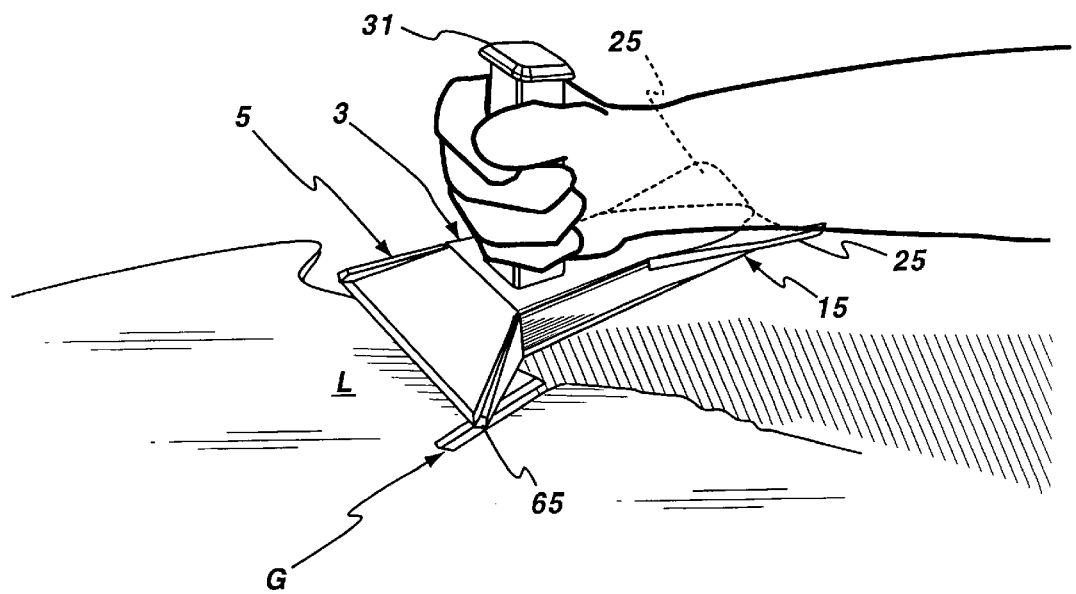
FIG. 7 is a perspective view showing the modified scraper in use.

In a further modification, as shown in FIGS. 6 and 7, the side edges 61 of the scraping section 5 can be beveled as shown at 63 to provide a short angled side scraping edge 65 at each end of the main scraping edge 5. Either short edge 65 can be used, by turning the scraper onto the short edge, to gouge a groove G through thick ice layers L as shown in FIG. 7. Much more force can be applied by the short side edge 65 making it much easier to gouge narrow grooves G which help break up the ice layer L.

The scraper can be molded in one piece from suitable plastic material. Alternatively, the scraper can have the scraping section, the handle section and the support section molded in one main piece and the hand grip molded in one secondary piece, the hand grip then attached to the main piece with suitable fastening means (not shown).

The forearm support section of the scraper has been shown in the drawings as being relatively short, extending for several inches only past the wrist. However, the support section could be made longer if desired extending in length nearly to the elbow, and thus further minimizing localized stress areas on the forearm during use.

While the scraper has been particularly described for removing ice from vehicle windshields, it could also be used for removing other materials from other surfaces.

I claim:

1. A hand-held scraper having:

a handle section with a front, a top surface and a bottom surface;

a hand grip carried by the handle section, the hand grip extending upwardly from the top surface of the handle section;

a scraping section carried by the handle section, the scraping section having a forwardly directed scraping edge and extending downwardly and forwardly from the rear of the bottom surface of the handle section with the scraping edge at the front of the scraping section and generally aligned with the longitudinal axis of the upwardly extending hand grip; and a forearm support section having a top surface extending rearwardly from the handle section in a position to rest solely against the bottom of a person's forearm when the person grips the hand grip to operate the scraper.

2. A scraper as claimed in claim 1 wherein the angle between the longitudinal axis of the hand grip and an imaginary line in the longitudinal center of the top surface of the support section ranges between eighty five degrees and one hundred and ten degrees.

3. A scraper as claimed in claim 1 wherein the top surface of the forearm support section is slightly concave in the longitudinal direction of the surface.

4. A scraper as claimed in claim 1 wherein the vertical distance between the center of gravity of the hand grip and the scraping edge is greater than the horizontal distance between the longitudinal axis of the hand grip and the scraping edge of the scraper.

5. A scraper as claimed in claim 1 wherein the scraping section has sides that are bevelled to provide narrow angled side scraping edges at either end of the scraping edge for use in gouging the material being scraped.

6. A scraper as claimed in claim 1 further comprising a winged section extending laterally from sides of the support section to help cradle the user's forearm.

7. A hand-held scraper comprising:
a handle section with a front, a top surface and a bottom surface;
a scraping section carried by the handle section, the scraping section having a forwardly directed scraping edge and extending forwardly from the front of the handle section with the scraping edge at the front of the scraping section;
a hand grip extending upwardly from the top surface of the handle section, the hand grip having a longitudinal axis in a direction generally perpendicular to the scraping edge of the scraping section; and
a forearm support section having a top surface extending rearwardly from the handle section in a position for the bottom of a person's forearm to rest thereon when the person grips the hand grip to operate said scraper, wherein the vertical distance between the center of gravity of the hand grip and the scraping edge is greater than the horizontal distance between the longitudinal axis of the hand grip and the scraping edge of the scraper.

8. A scraper as claimed in claim 7 wherein the hand grip is substantially on one side and the scraping edge is on the other side of an imaginary line passing through the longitudinal center of the top surface of the support section against which a person's forearm rests.

9. A scraper as claimed in claim 7 wherein the angle between the longitudinal axis of the hand grip and an imaginary line in the longitudinal center of the top surface of the support section ranges between eighty-five degrees and one hundred and ten degrees.

10. A scraper as claimed in claim 7 wherein the top surface of the forearm support section is slightly concave in the longitudinal direction of the surface.

11. A hand-held scraper comprising:
a handle section having a front, a top surface and a bottom surface;
a hand grip carried by the handle section, the hand grip extending upwardly from the too surface of the handle section;
a scraping section carried by the handle section, the scraping section having a forwardly directed scraping edge, said scraping section downwardly and forwardly from a lower front corner of the handle section with a scraping edge at the front of the scraping section and located just in front of the longitudinal axis of the upwardly extending hand grip; and
a forearm support section having a top surface extending rearwardly from the handle section in a position for the bottom of a person's forearm to rest against when the person grips the hand grip to operate the scraper, wherein the vertical distance between the center of gravity of the hand grip and the scraping edge is greater than the horizontal distance between the longitudinal axis of the hand grip and the scraping edge of the scraper.

12. A scraper as claimed in claim 11 wherein the angle between the longitudinal axis of the hand grip and an imaginary line in the longitudinal center of the top surface of the support section ranges between eight-five degrees and one hundred and ten degrees.

13. A scraper as claimed in claim 11 wherein the top surface of the forearm support section is slightly concave in the longitudinal direction of the surface.

14. A hand-held scraper comprising:
a handle section with a front, a top surface and a bottom surface;
a scraping section carried by the handle section, the scraping section having a forwardly directed scraping edge and extending forwardly from the front of the handle section with the scraping edge at the front of the scraping section;
a hand grip extending upwardly from the top surface of the handle section, the hand grip having a longitudinal axis in a direction generally perpendicular to the scraping edge of the scraping section; and
a forearm support section having a top surface extending rearwardly from the handle section in a position for the bottom of a person's forearm to rest thereon when the person grips the hand grip to operate said scraper, wherein the scraping section has sides that are bevelled to provide narrow angled side scraping edges at either end of the scraping edge for use in gouging the material being scraped.

15. A hand-held scraper comprising:
a handle section having a front, a top surface and a bottom surface;
a hand grip carried by the handle section, the hand grip extending upwardly from the top surface of the handle section;
a scraping section carried by the handle section, the scraping section having a forwardly directed scraping edge, said scraping section downwardly and forwardly from a lower front corner of the handle section with a scraping edge at the front of the scraping section and located just in front of the longitudinal axis of the upwardly extending hand grip; and
a forearm support section having a top surface extending rearwardly from the handle section in a position for the bottom of a person's forearm to rest against when the person grips the hand grip to operate the scraper, wherein the scraping section has sides that are bevelled to provide narrow angled side scraping edges at either end of the scraping edge for use in gouging the material being scraped.

16. A hand-held scraper comprising:
a handle section with a front, a top surface and a bottom surface;
a scraping section carried by the handle section, the scraping section having a forwardly directed scraping edge and extending forwardly from the front of the handle section with the scraping edge at the front of the scraping section;

a hand grip extending upwardly from the top surface of the handle section, the hand grip having a longitudinal axis in a direction generally perpendicular to the scraping edge of the scraping section; and a forearm support section having a top surface extending rearwardly from the handle section in a position for the bottom of a person's forearm to rest thereon when the person grips the hand grip to operate said scraper, further comprising a winged section extending laterally from sides of the support section to help cradle the user's forearm.

17. A hand-held scraper comprising:

a handle section having a front, a top surface and a bottom surface;

a hand grip carried by the handle section, the hand grip extending upwardly from the top surface of the handle section;

a scraping section carried by the handle section, the scraping section having a forwardly directed scraping edge, said scraping section downwardly and forwardly from a lower front corner of the handle section with a scraping edge at the front of the scraping section and located just in front of the longitudinal axis of the upwardly extending hand grip; and a forearm support section having a top surface extending rearwardly from the handle section in a position for the bottom of a person's forearm to rest against when the person grips the hand grip to operate the scraper, further comprising a winged section extending laterally from sides of the support section to help cradle the user's forearm.

* * * * *